United States Patent
Feather et al.

[15] 3,691,212
[45] Sept. 12, 1972

[54] 17α-(1',3'-ALKADIYNYL)-17β-ACYLOXY(17β-AROYLOXY) STEROIDS

[72] Inventors: Peter Feather, Burgess; Colin Michael Burgess, both of London, England

[73] Assignee: The British Drug Houses Limited, London, England

[22] Filed: April 24, 1970

[21] Appl. No.: 29,747

Related U.S. Application Data

[63] Continuation of Ser. No. 728,884, May 14, 1968, abandoned.

[52] U.S. Cl. ............260/397.4, 260/397.5, 424/243
[51] Int. Cl. ............................................C07c 169/20

[58] Field of Search..................260/397.9

[56] References Cited

UNITED STATES PATENTS

| | | | |
|---|---|---|---|
| 3,435,030 | 3/1969 | Klimstra | 260/239.55 |
| 3,436,412 | 4/1969 | Chinn | 260/397.5 |
| 3,442,918 | 5/1969 | Zeather et al. | 260/397.4 |

*Primary Examiner*—Elbert L. Roberts
*Attorney*—Bacon & Thomas

[57] ABSTRACT

17α-(1',3'-Alkadiynyl)-17β-acyloxy(17β-aroyloxy) steroids of the androstane and oestrane series having utility in treatment of conditions or defects of the reproductive system are disclosed.

3 Claims, No Drawings

17α-(1',3'-ALKADIYNYL)-17β-ACYLOXY(17β-AROYLOXY) STEROIDS

This application is a continuation of Ser. No. 728,884 filed May 14, 1968 and now abandoned.

This invention is for improvements in or relating to organic compounds and has particular reference to 17α-(b 1', 3'-alkadiynyl)-17β-acyloxy(17β-aroyloxy)-steroid.

It is an object of the present invention to provide novel 17α-(1',3'-alkadiynyl)-17β-acyloxy (1β-aroyloxy) steroids of the androstane and oestrane series, having, in the 17-position the structure

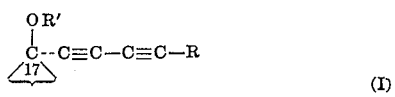

where R is an alkyl group containing up to five carbon atoms and R' is an acyl, cyclic acyl or aroyl group containing not more than 20 carbon atoms.

The new compounds of the present invention are of value in the art on account of their hormonal and antihormonal properties, including oestrogenic, progestational, claudogenic, ovulation-inhibiting and gonadotrophin-inhibiting properties. Thus, the compounds are of value in preparations for the treatment of a wide range of conditions and defects of the reproductive system and for the limitation or enhancement of fertility. Moreover, the compounds of the present invention may maintain their biological activity for a prolonged period after administration.

The new steroids may be administered in standard pharmaceutical and veterinary forms, such for example as tablets, injections, vaginal sponges, and tampons.

The present invention provides the following specific 17α-(1',3'-alkadiynyl)-17β-acyloxy(17β-aroyloxy)-steroids:

17β-acetoxy-17α-(1',3'-hexadiynyl)-3-methoxy-1,3,5(10)-oestratriene;
17β-acetoxy-3-methoxy-17α-(1',3'-pentadiynyl)-1,3,5(10)-oestratriene;
17β-acetoxy-17α-(1',3'-hexadiynyl)-4-oestren-3-one;
3β,17β-diacetoxy-17α-(1',3'-hexadiynyl)-4-oestrene;
17α-(1',3'-hexadiynyl)-17β-hexanoyloxy-4-oestren-3-one;
17β[(1'-adamantyl)-acetoxy]-17α-(1'',3''-hexadiynyl)-4-oestren-3-one;
17β-acetoxy-17α-(1',3'-heptadiynyl)-3-methoxy-1,3,5(10)-oestratriene;
17α-(1',3'-hexadiynyl)-3-methoxy-17β-propionoxy-1,3,5(10)-oestratriene;
17α-(1',3'-hexadiynyl)-3-methoxy-17β-(3''-phenylpropionoxy)-1,3,5(10)-oestratriene;
17β-Benzoyloxy-17α-(1',3'-hexadiynyl)-3-methoxy-1,3,5(10)-oestratriene;
17α-(1',3'-hexadiynyl)-17β-hexanoyloxy-3-methoxy-1,3,5(10)-oestratriene;
3β,17β-diacetoxy-17α-(1',3'-hexadiynyl)-5-androstene;
3β,17β-diacetoxy-17α-(1',3'-hexadiynyl)-4-androstene.

According to the present invention there is also provided a process for the preparation of a 17α-(1',3'-alkadiynyl)-17β-acyloxy(17β-aroyloxy)-steroid, having in the 17-position the structure (I) above, which process comprises esterification of a 17α-(1',3'-alkadiynyl)-17β-hydroxy steroid (I: R' = H). The esterification may be achieved by reaction of the 17β-hydroxy steroid (I; R' = H) with an appropriate acid chloride or anhydride. The esterification may be carried out in the presence of an organic base for example pyridine.

The acyl, cyclic acyl and aroyl groups (R' in Formula (I)) are derived from aliphatic carboxylic acids such as acetic, propionic, caproic and stearic acids, from alicyclic carboxylic acids such as adamantyl acetic acid and carboxylic acids containing phenyl groups such as benzoic and phenylpropionic acids.

17α-(1',3'-Alkadiynyl)-17β-hydroxy steroids suitable for use as starting materials may be prepared by procedures described in our copending applications Ser. No. 576,866 filed Sept. 2, 1966, now U.S. Pat No. 3,442,918; Ser. No. 612,081 filed Jan. 27, 1967, now U.S. Pat. No. 3,463,797; Ser. No. 620,600 filed Mar. 6, 1967, now U.S. Pat. No. 3,442,919; and Ser. No. 708,526 filed Feb. 27, 1968.

Certain functional groups other than the hydroxyl group at $C_{17}$, if present in the molecule of the steroidal starting material, may undergo reaction with the esterifying reagents employed in the process of the invention. Thus, for example, hydroxy-groups, and in particular hydroxy-groups at positions $C_1$, $C_3$, $C_4$ and $C_6$, readily undergo esterification; enolisable oxo-groups, for example, a 3-oxo-group in the presence of a 4-ene linkage, may undergo enol-esterification. Such hydroxy and enolisable oxo-groups may, if desired, be regenerated selectively by controlled hydrolysis.

In certain cases, undesired enol-esterification of readily enolisable oxo-groups and esterification of hydroxy groups, in particular hydroxy groups at $C_5$ or $C_{11}$, may be avoided or minimized by suitable choice of reagents and reaction conditions. Alternatively, if desired, a 17α-(1',3'-alkadiynyl)-17β-hydroxy steroid may be employed as starting material containing groups and/or double bonds different from those required in the end product, but capable of conversion thereto by a mild hydrolysis process, following esterification of the 17β-hydroxy group. For example, a 3-ketal 5-ene or 3-enol ether (including a 3-alkoxy-2,5(10)-diene) may subsequently be hydrolysed under controlled conditions to afford a 4-en-3-one; or a tetrahydropyranyl ether may be hydrolysed to afford a hydroxy-group.

In certain instances, concomitant enol-esterification and/or esterification of groups other than the 17β-hydroxy group may provide steroids of valuable biological properties.

New steroids provided by the present invention may belong to the androstane or oestrane series and may, in addition to the aforementioned 17α-(1',3'-alkadiynyl)-17β-acyloxy(aroyloxy) groups optionally contain unsaturated linkages at $C_1$, $C_2$, $C_3$, $C_4$, $C_{5(10)}$, $C_6$, $C_7$, $C_8$, $C_{9(11)}$, $C_{11}$ or $C_{14}$ or combinations of two or more such unsaturated linkages, including aromatic systems in Rings A and B; hydroxy groups at $C_1$, $C_3$, $C_4$, $C_5$, $C_6$, $c_{11}$ or derived acyloxy or aroyloxy groups (which, if the same as that at $C_{17}$, may contain up to 20 carbon atoms and, if different, may contain up to five carbon atoms); combinations of two or more such hydroxy and/or derived acyloxy or aroyloxy groups; 3-diaminolakoxy groups in which the alkyl groups may contain up to five carbon atoms; 3-alkoxy groups containing up to five carbon atoms; alkyl or alkenyl groups containing up to three carbon atoms, at $C_1$, $C_2$, $C_4$, $C_6$, $C_7$ or $C_{16}$; 18-methyl or 18-ethyl groups; carbonyl groups at $C_2$, $C_3$, $C_6$, $C_{11}$ or $C_{12}$ or combinations of two or more such groups. Following is a description by way of example of methods of carrying the invention into effect.

EXAMPLE 1

17β-Acetoxy-17α-(1',3'-hexadiynyl)-4-oestren-3-one

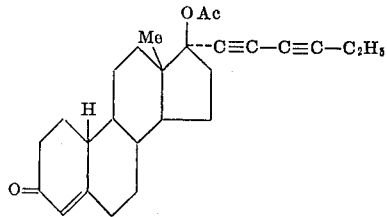

A mixture of 17α-(1',3'-hexadiynyl)-4-oestren-17β-ol-3-one (1.80 g.), pyridine (29 ml.) and acetic anhydride (17 ml.) was heated under reflux, with exclusion of moisture, under nitrogen, for 2½ hours, cooled and poured into dilute aqueous sodium bicarbonate solution. The steroidal product was recovered by extraction with ether and purified by crystallization from ether/petroleum ether and from methanol, affording 17β-acetoxy-17α-(1',3'-hexadiynyl)-4-oestren-3-one, m.p. 180°C., $[\alpha]_D^{20}$ -97° (c, 0.82 in dioxan).

EXAMPLE 2

17β-Acetoxy-3-methoxy-17α-(1',3'-pentadiynyl)-1,3,5(10)-oestratriene

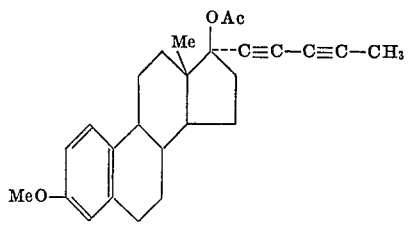

A mixture of 3-methoxy-17α-(1',3'-pentadiynyl)-1,3,5(10)-oestratrien-17β-ol (0.80 g.), pyridine (8 ml.) and acetic anhydride (4.8 ml.) was heated under reflux for 2½ hours, cooled and poured into water. The steroidal product was collected and purified by crystallization from methanol, affording 17β-acetoxy-3-methoxyl17α-(1',3'-pentadiynyl)-1,3,5(10)-oestratriene, m.p. 144°C., $[\alpha]_D^{25}$ -58° (c, 0.34 in dioxan).

EXAMPLE 3

17β-Acetoxy-17α-(1',3'-hexadiynyl)-3-methoxy-1,3,5-(10)-oestratriene

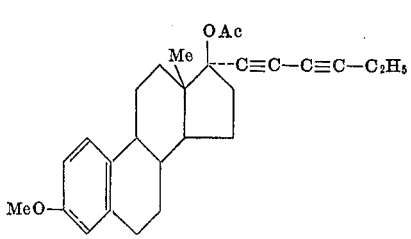

A mixture of 17α-(1',3'-hexadiynyl)-3-methoxy-1,3,5(10)-oestratrien-17β-ol (8.0 g.), pyridine (80 ml.) and acetic anhydride (48 ml.) was heated under reflux for 2½ hours, under nitrogen, cooled and poured into water. The steroidal product was collected and purified from aqueous methanol, affording 17β-acetoxy-17α-(1',3'-hexadiynyl)-3-methoxy-1,3,5(10)-oestratriene, m.p. 130°C., $[\alpha]_D^{22}$ -59° (c, 0.96 in dioxan).

The compound showed pronounced claudogenic activity when tested in rats. In the rat oral claudogenic test a dose of 10 μg per kilogram per day for 5 days led to no pregnancies giving 100 percent claudonenic activity.

EXAMPLE 4

3β,17β-Diacetoxy-17α-(1',3'-hexadiynyl)-4-oestrene

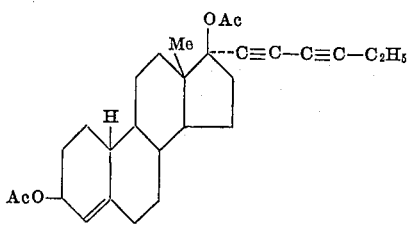

17α-(1',3'-Hexadiynyl)-4-oestren-3β,17β-diol (0.50 g.) was added to pyridine (12.5 ml.) and acetic anhydride (12.5 ml.) and the mixture was refluxed for 2 hours, cooled and poured into water. The steroidal product was collected and purified by crystallization from aqueous methanol, affording 3β,17β-diacetoxy-17α-(1',3'-hexadiynyl)-4-oestrene, m.p. 137°C., $[\alpha]_D^{20}$ -105° (c, 0.18 in ethanol).

EXAMPLE 5

17α-(1',3'-Hexadiynyl)-17β-hexanoyloxy-4-oestren-3-one

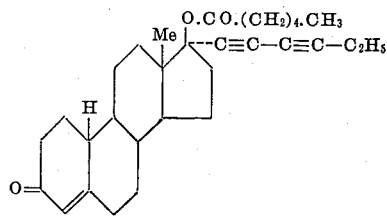

A mixture of 17α-(1',3'-hexadiynyl)-4-oestren-17β-ol-3-one (1.61 g.), toluene p-sulphonic acid (0.95 g.) and hexanoic anhydride (25 ml.) was stirred for 5½ hours at room temperature, and then poured into water (250 ml.) containing pyridine (22 ml.). The resulting aqueous suspension was partially freed from impurities by stream-distillation and the residual gum was separated and treated in methanol (75 ml.) with concentrated hydrochloric acid (0.75 ml.). The mixture was refluxed for 15 minutes under nitrogen, then added to water, and the steroidal product was isolated by extraction with ether. Purification by thin-layer chromatography on silica-gel, eluting with toluene/ethyl acetate, afforded amorphous 17α-(1',3'-hexadiynyl)-17β-hexanoyloxy-4-oestren-3-one, $\nu_{max}^{CCl_4}$ 2955, 2930, 2870, 2250, 1747, 1676, 1616; $\nu_{max}^{CS_2}$ 1161 cm$^{-1}$, $\lambda_{max.}$ 239.5 μ (ε, 15,700).

EXAMPLE 6

17β[(1'-Adamantyl)-acetoxy]-17α-(1'',3''-hexadiynyl)-4-oestren-3-one

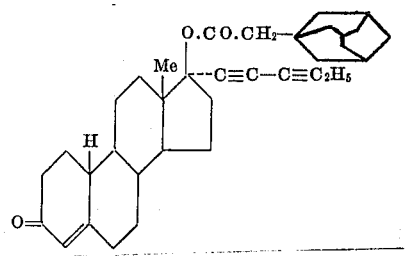

A mixture of (1-adamantyl) acetic acid (12 g.) and acetic anhydride (150 ml.) was heated under reflux for 3½ hours. Most of the acetic anhydride was then removed by distillation, and the residue purified by crystallization from light petroleum. (1-Adamantyl) acetic anhydride formed crystals, m.p. 87°–89°C.

A mixture of 17α-(1',3'-hexadiynyl)-4-oestren-17β-ol-3-one (2.00 g.), pyridine (10 ml.) and (1-adamantyl)-acetic anhydride (2.0 g.) was heated under reflux for 21 hours, allowed to cool and poured into water. Volatile impurities were removed by steam distillation. The amorphous steroidal product was collected and treated in methanol (50 ml.) with dilute hydrochloric acid (2.0 ml. of 4N) at room temperature for 1 hour in order to hydrolyze any steroidal enol ester which may have been formed. Water was added and the steroidal product isolated by extraction with ether.

Purification by thin-layer chromatography on silicagel, eluting with toluene/ethyl acetate, and crystallization from methanol, gave 17β-[(1'-adamantyl)-acetoxy]-17α-(1'',3''-hexadiynyl)-4-oestrene-3-one, m.p. 170°C., $[\alpha]_D^{29} - 33°$ (c, 0.60 in EtOH); $\lambda_{max.}^{EtOH}$ 239 $\mu$ ($\epsilon$, 17100).

EXAMPLE 7

17β-Acetoxy-17α-(1',3'-heptadiynyl)-3-methoxy-1,3,5(10)-oestratriene

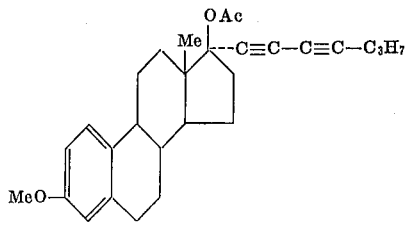

A mixture of 17α-(1',3'-heptadiynyl)-3-methoxy-1,3,5(10)-oestratrien-17β-ol (3.50 g.), pyridine (28 ml.) and acetic anhydride (16.8 ml.) was treated under reflux for 2½ hours, cooled and poured into water. The steroidal product was collected and purified by crystallization from methanol, affording 17β-acetoxy-17α-(1',3'-heptadiynyl)-3-methoxy-1,3,5(10)-oestratriene, m.p. 127°C., $[\alpha]_D^{26} - 52°$ (c, 0.21 in dioxan).

EXAMPLE 8

17α-(1',3'-hexadiynyl)-3-methoxy-17β-propionoxy-1,3,5(10)-oestratriene

A mixture of 17α-(1',3'-hexadiynyl)-3-methoxy-1,3,5(10)-oestratriene-17β-ol (5.00 g.), pyridine (80 ml.) and propionic anhydride (48 ml.) was heated on the steam-bath for 14 hours, cooled and poured into water. The steroidal product was collected and purified by crystallization from methanol, affording 17α-(1',3'-hexadiynyl)-3-methoxy-17β-propionoxy-1,3,5(10)-oestratriene, m.p. 114.5°C., $[\alpha]_D^{23} - 63.5°$ (c, 0.96 in dioxan).

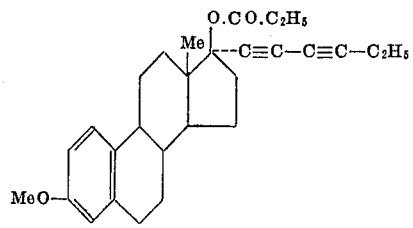

EXAMPLE 9

17α-(1',3'-Hexadiynyl)-3-methoxy-17β-(3''-phenylpropionoxy)-1,3,5(10)-oestratriene

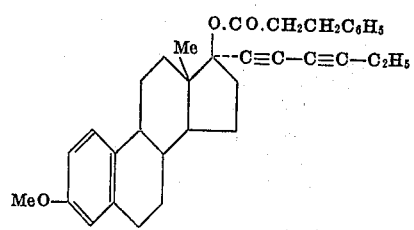

3-Phenylpropionyl chloride (2.50 ml.) was added dropwise to a solution of 17α-(1',3'-hexadiynyl)-3-methoxy-1,3,5(10)-oestratriene-17β-ol (2.50 g.) in anhydrous pyridine (40 ml.). The mixture was heated under reflux for 20 hours, cooled and poured into water. The steroidal product was isolated by extraction with ether and purified by chromatography on neutral alumina. Elution with toluene afforded amorphous 17α-(1',3'-hexadiynyl)-3-methoxy-17β-(3''-phenylpropionoxy)-1,3,5(10)-oestratriene, $[\alpha]_D^{25} - 19°$ (c, 1.4 in dioxan); $\lambda^{EtOH}_{max.}$ 246 $\mu$($\epsilon$, 2100); 259 $\mu$ ($\epsilon$, 2600); 269 $\mu$ ($\epsilon$, 2500); 277.5 $\mu$ ($\epsilon$, 2300); 287 $\mu$ ($\epsilon$, 2100); $\nu^{CCl_4}_{max.}$ 2255, 1748, 1610, 1454 cm$^{-1}$, $\nu^{CS_2}_{max.}$ 1237, 1156, 1031, 698 cm$^{-1}$.

EXAMPLE 10

17β-Benzoyloxy-17α-(1',3'-hexadiynyl)-3-methoxy-1,3,5(10)-oestratriene

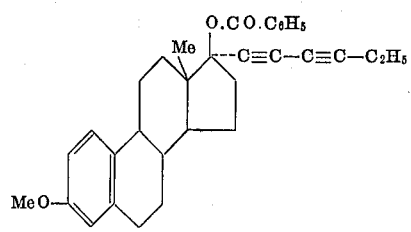

Benzoyl chloride (1.8 ml.) was added dropwise to a solution of 17α-(1',3'-hexadiynyl)-3-methoxy-1,3,5(10)-oestratrien-17β-ol (0.50 g.) in anhydrous pyridine (4 ml.) The mixture was heated at 80°C. for 15 hours, cooled and poured into water. The steroidal product was isolated by extraction with methylene dichloride and purified by chromatography on a dry alumina column. Elution with a mixture of cyclohexane and ethyl acetate (10:1 V/V) afforded amorphous 17β-benzoyloxy-17α-(1',3'-hexadiynyl)-3-methoxy-1,3,5(10)-oestratriene, $[\alpha]_D^{25} - 6.4°$ (c, 0.39 in dioxan); $\lambda^{EtOH}_{max.}$ 270.5 $\mu$($\epsilon$, 3280); 286 $\mu$ (2870); $\nu^{CCl_4}_{max.}$ 2250, 1725, 1608, 1449, 1379, 1311 cm$^{-1}$; $\nu^{CS_2}_{max.}$ 710 cm$^{-1}$.

EXAMPLE 11

17α-(1',3'-Hexadiynyl)-17β-hexanoyloxy-3-methoxy-1,3,5(10)-oestratriene

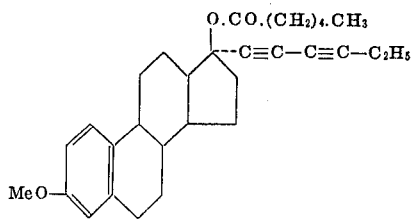

A mixture of 17α-(1',3'-hexadiynyl)-3-methoxy-1,3,5(10)-oestratrien-17β-ol (1.50 g.), pyridine (15 ml.) and hexanoic anhydride (7.5 ml.) was heated under reflux for 8 hours, allowed to cool and poured into water. The steroidal product was isolated by extraction with ether and purified by chromatography on alumina. Elution with toluene afforded amorphous 17α-(1',3'-hexadiynyl)-17β-hexanoyloxy-3-methoxy-1,3,5(10)-oestratriene, $[\alpha]^{26}_D - 36°$ (c, 0.6 in dioxan); $\lambda^{EtOH}_{max.}$ 278 μ (ε, 2070); 287 μ (ε, 1880); $\nu^{CCl_4}_{max.}$ 2250, 1748, 1610, 1465, 1453 cm$^{-1}$; $\nu^{CS_2}_{max.}$ 1237, 1160, 1030 cm$^{-1}$.

EXAMPLE 12

3β,17β-Diacetoxy-17α-(1',3'-hexadiynyl)-5-androstene

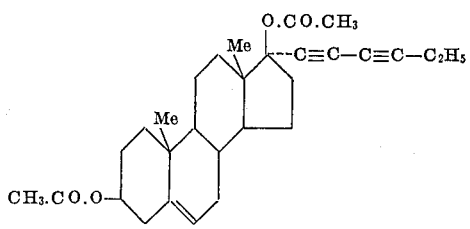

A mixture of 17α-(1',3'-hexadiynyl)-5-androstene-3β,17β-diol (0.50 g.), pyridine (12 ml.) and acetic anhydride (12 ml.) was heated under reflux for 1 hour, allowed to cool and poured into water. The precipitate was collected and purified by crystallization from aqueous ethanol, affording 3β,17β-diacetoxy-17α-(1',3'-hexadiynyl)-5-androstene, m.p. 143°C., $[\alpha]^{24}_D - 134°$ (c, 0.51 in EtOH).

EXAMPLE 13

3β,17β-Diacetoxy-17α-(1',3'-hexadiynyl)-4-androstene

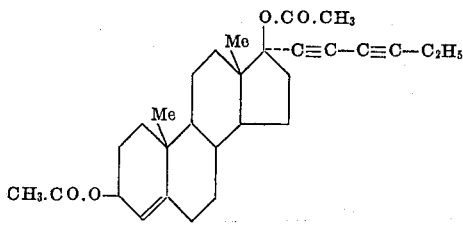

A mixture of 17α-(1',3'-hexadiynyl)-4-androstene-3β,17β-diol (0.50 g.), pyridine (12 ml.) and acetic anhydride (12 ml.) was heated under reflux for 1 hour, allowed to cool and poured into water. The precipitate was collected and purified by crystallization from aqueous ethanol, to give 3β,17β-diacetoxy-17α-(1',3'-hexadiynyl)-4-androstene, m.p. 99°C., $[\alpha]^{25}_D - 71°$ (c, 0.41 in EtOH); $\nu^{CCl_4}_{max.}$ 2253, 1750, 1737, 1664 cm$^{-1}$; $\nu^{CS_2}_{max.}$ 1229, 1020 cm$^{-1}$.

We claim:
1. 3β,17β-Diacetoxy-17α-(1',3'-hexadiynyl)-4-oestrene.
2. 17β-[(1'-Adamantyl)-acetoxy]-17α-(1'',3''-hexadiynyl)-4-oestren-3-one.
3. 3β,17β-Diacetoxy-17α-(1',3'-hexadiynyl)-4-androstene.

* * * * *